(No Model.)
E. H. ROSE.
SEWER, WATER, OR DRAIN PIPE LAYING DEVICE.
No. 478,024. Patented June 28, 1892.
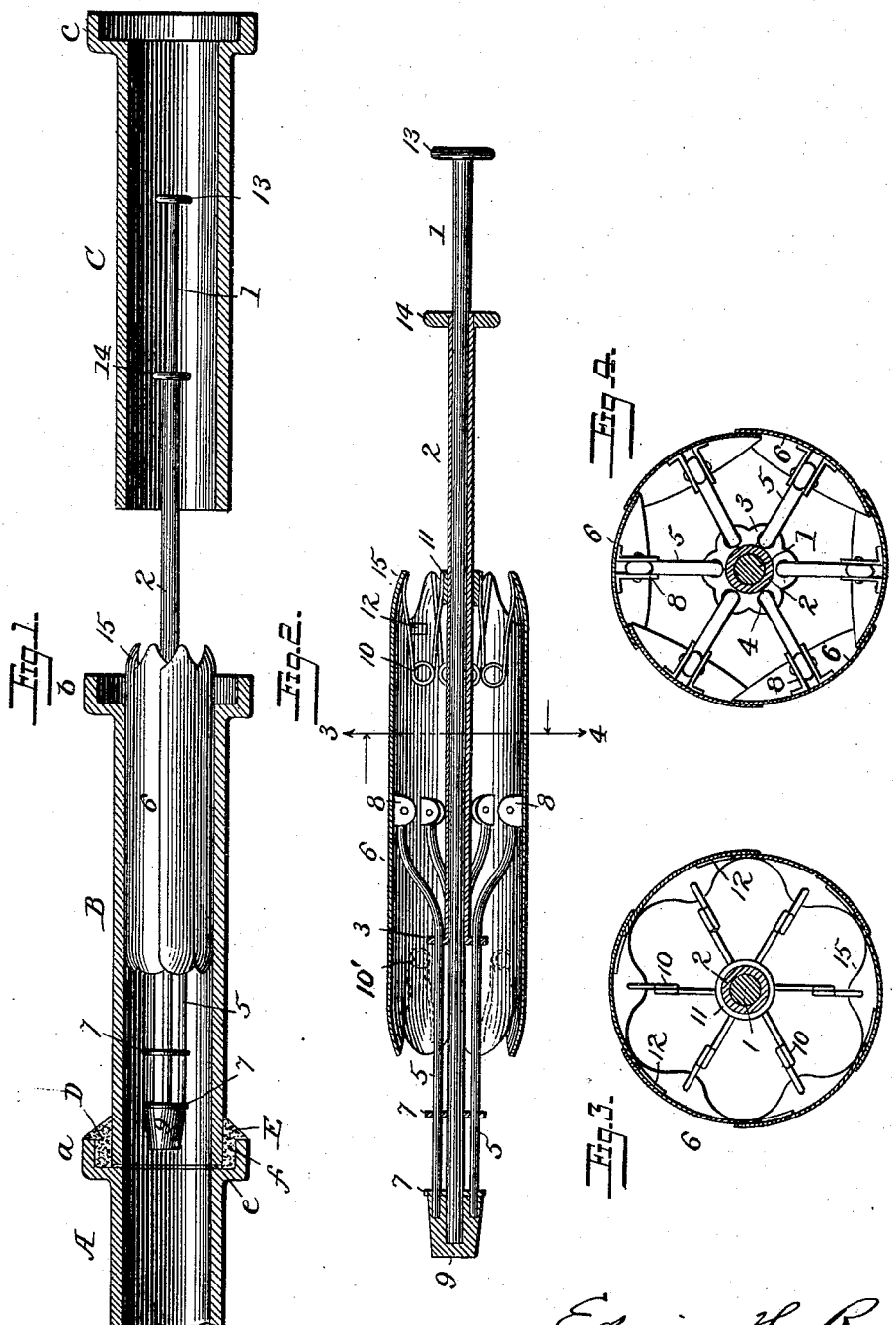
WITNESSES
INVENTOR,
his Attorney

UNITED STATES PATENT OFFICE.

EDWIN H. ROSE, OF COLTON, CALIFORNIA.

SEWER, WATER, AND DRAIN PIPE LAYING DEVICE.

SPECIFICATION forming part of Letters Patent No. 478,024, dated June 28, 1892.

Application filed June 26, 1891. Serial No. 397,648. (No model.)

*To all whom it may concern:*

Be it known that I, EDWIN H. ROSE, a citizen of the United States, residing at Colton, in the county of San Bernardino and State of California, have invented certain new and useful Improvements in Sewer, Water, and Drain Pipe Laying Devices, of which the following is a specification.

My invention has for its object to produce a device or implement adapted to be used by workmen in the laying of tile and cement or vitrified sewer or water pipes, by which the work of laying such pipes can be more quickly and skillfully performed than by use of means now in vogue, and by which even an unskilled laborer can lay such pipe quickly and yet insure that the sections shall be laid in proper alignment and that the joints shall be securely closed by the cement or other material used therefor, and, further, insure that the interior of the tube or conduit formed by such united sections of pipe shall be freed from all accumulations of cement or other material on its inner surface, which shall be left perfectly smooth, so as not in any wise to obstruct the flow through such conduit or serve to collect and hold sediment or other material.

My invention consists of the device to be hereinafter described for the accomplishment of these ends.

In the drawings I have shown the preferred form of my invention, and in such drawings Figure 1 is a side elevation of the device, three sections of water or sewer pipe being shown in section in connection therewith. Fig. 2 is a central longitudinal section of the device; and Figs. 3 and 4 are transverse sections, enlarged, taken on the line 3 4 of Fig. 2, looking in opposite directions.

In the drawings, A, B, and C represent three sections of sewer or water pipe, they being of the usual construction, each with one expanded end $a$, $b$, and $c$, respectively. The pipes A and B are represented as being in place and properly united by cement D and the pipe C as being moved into place toward the pipe B over the device which constitutes my invention.

This device consists of a core adapted to fit the interior of the pipe, to be slipped through the same, and to project from the end thereof, so that it may serve the double purpose of acting as a support, upon which may be laid the cement within the enlarged end of the tube, and also as a centering device for the next tube to be laid, thus insuring that the tubes shall be laid in perfect alignment, and also that the joints between the tubes shall be made perfectly tight.

The device further serves to clean the interior of the tubes, wiping off and removing any cement which may escape at the joints of the pipe as it is drawn through the pipe, and thus insuring that a line of pipe laid with the aid of my invention shall be perfectly smooth on its inner surface, there being neither projecting shoulders formed by the ends of the tubes by reason of their being out of proper alignment or by pieces of cement which project from the interior surface of the tubes at the joints of the pipes, both of which conditions form obstructions in the line of pipe to the free passage of water through it and afford opportunities for the collection of matter which will interfere with the effectiveness of the tube as a water-conduit. This core is preferably expansible and collapsible, so that within certain limits it may fit any size of pipe and so that it may be easily placed into a pipe and then expanded until it closely fits the interior thereof.

Having thus broadly stated the characteristic features of my invention, I will describe in detail the device in which the invention is embodied.

1 is a rod upon which the device is supported and which is preferably somewhat longer than the length of the sections of sewer or other pipe in connection with which the device is to be used. Upon this rod is mounted the sleeve 2, which carries a perforated plate 3, preferably at its inner end. In this plate are a number of holes 4, through which pass the rods 5, which constitute the supports for the separate sections or plates 6, which together constitute the expansible core hereinbefore referred to. The rods 5 are secured at their ends to the inner end 9 of the rod 1, and are preferably also supported by one or more plates or bearing-pieces 7 upon the rod 1, arranged at short distances from the end thereof. The other or free ends of the rods 5 have flexible connections, preferably in the form of hinges 8, with the plates or sections 6, such connections being approximately midway between the ends of the sections. The outer or forward ends of the plates or sections 6 are supported and held outward, so as to expand the core by the springs 10, which connect the said sections with a collar 11, which is free to slide upon the sleeve 2. The plates 6 are imbricated, so that the core has a practically closed exterior surface whether it be contracted or expanded. In order to insure that the plates shall come back into position, so as to properly overlap one another, even though they should be thrown outward so far as that their edges should separate slightly, I provide the underlying edges of the plates with tongues or strips 12, which project beyond the edges of the plate and incurve somewhat. These strips or tongues are so long that a portion of each always underlies the upper or outer edge of the adjacent plate, even when the plates are moved outward to their farthest extent of movement. There may be two or more of these strips 12 to each section 6, although one at the forward end of each section will usually be sufficient. The outer ends of the sections or plates 6 are curved inward, as at 15, to facilitate the sliding of the sections of pipe onto the core.

The rod 1 and the tube 2 are provided, respectively, with handles 13 and 14, so that the device may be the more easily operated and the sleeve slid upon the rod. As the sleeve 2 is drawn forward upon the rod the plate 3 slides toward the ends of the rods 5, which are connected with the section 6, and as these rods pass through the perforations in the plate they are drawn down or toward the central rod 1, and the plates 6 are thus pulled inward, compressing the springs 10 and contracting the core, which can then be easily slipped into a section of pipe. After having been inserted into a pipe the sleeve is slid in the opposite direction—that is, backward—and the core is expanded until it fits the interior of the section of pipe, the springs 10 insuring that the sections or plates shall be held outward. The core having been inserted into a tube and expanded is drawn so that its forward end projects beyond the expanded end thereof, as shown in Fig. 1. Cement or such other material as may be employed to close the joints between the sections of pipe is then laid upon the core within the expanded end of the pipe, as indicated at D, Fig. 1. A section of pipe C is then slipped over the core, which being fitted tightly within the pipe-section B insures that the section being brought into place shall be in perfect alignment therewith. The outer ends 15 of the sections or plates 6 being curved inward gives the core a reduced diameter at its very end, so that the tube C may be slipped thereon easily, and the plates being held outward by a yielding pressure device they will adjust themselves to the interior of the pipe-section just put into place.

The straight end of the tube C being forced into the expanded end of the pipe B crowds the cement which has already been laid around the entire inner portion of the expanded part $b$ of the tube B forward between its end and the shoulder within the part $b$ of the pipe, as at $e$, and between the inner surface of the part $b$ and the outer surface of the tube C, as at $f$, so that there is a perfect filling of all the spaces between the tubes, the core operating to prevent the cement from being crowded out from the joint on the inside of the tube. A rotation of the pipe C while its end is being crowded into the cement helps to secure a perfectly-close joint. After this operation the joint is completed by adding cement at E to fill the space between the part $b$ of the tube B and the outside of the tube C, and properly shaping the outer surface of the cement. After the joint is completed the core is drawn forward until it occupies the position relative to the pipe C that in Fig. 1 it is shown as occupying in relation to the pipe-section B. This drawing forward of the core cleans the inside of the tube in the manner already described.

By the use of this device there is a considerable saving in the amount of cement required to make a good joint, as there is no waste on the inside of the pipe. It also insures that there is a layer of cement which is practically homogeneous and of uniform thickness around the entire end of the pipe, whereas by the present methods of laying such pipe much skill and care is required to prevent the straight end of the pipe from dropping down somewhat in the expanded end of the pipe into which it is inserted, thus forming a shoulder on the inside of the conduit at the joint and making a joint which is but imperfectly closed.

While I have shown and propose to use but one set of springs 10—that is, one spring for each section-plate 6—a plurality of springs for each plate might be used. Thus the inner ends of the plates might be springs pressed as well as the outer, as indicated in dotted lines at 10' in Fig. 2. It will be understood that both the springs 10 and 10' and the rods 5, with the means shown for forcing them outward, are devices for forcing outward the plates, and thus expanding the core, and that under certain conditions it might be found advantageous to employ either one of these means without the other for the purpose of expanding the core.

While I have shown my invention embodied in a device adapted to be used in connection with the usual cylindrical sewer and drain pipes, still it will be evident that it may be adapted to be used in connection with pipe polygonal in cross-section, as square, hexagonal, or octagonal, or with oval or other shaped pipe.

I am aware that it has been proposed to use a straight-edge for aligning drain-pipes, it consisting of a series of heads which support a series of several separated longitudinal bars, which are arranged to rest against the interior surface of the pipes; and I am also aware that scraping devices for cleaning the interiors of pipes and consisting of a central support and one or more scraper-plates held outward with a yielding pressure so as to bear against and scrape the interior surface of the pipes, are old; but devices of these kinds differ essentially from my invention, which, as has been described, consists of a core adapted to fit the interior surface of the pipes, and serving as a device for aligning the pipes, as a core or support for the cement at the joints, and as a cleaner for the inner surfaces of the pipes.

Without limiting myself to the precise construction and arrangement of parts shown, what I claim is—

1. An expansible core adapted for use in the laying of sewer and similar pipes, consisting of a series of plates arranged to lie side by side and form a substantially unbroken surface, whereby the core conforms to the interior surface of the pipe, the said plates being straight throughout a considerable portion of their length and parallel with the interior surface of the pipe, whereby the core is adapted to be used to align the pipes and also to project beyond the end thereof in line with the interior surface to serve as a support for the cement, substantially as set forth.

2. In a device adapted for use in the laying of sewer, drain, and water pipes, the combination of the central support, a series of plates arranged around the support to form a core adapted to conform to the interior of the said pipes, and the springs which yieldingly hold the said plates outward, substantially as set forth.

3. In a device adapted for use in the laying of sewer, drain, and water pipes, the combination of the central support and a collapsible and expansible core carried thereby, consisting of a series of imbricated plates, substantially as set forth.

4. In a device adapted for use in the laying of sewer, drain, and water pipes, the combination of a central support, a contractible and expansible core consisting of a series of imbricated plates, and the tongues or strips 12, carried by the underlying edges of the plates and projecting inward and beyond the edges of plates, substantially as set forth.

5. In a device adapted for use in the laying of sewer, drain, and water pipes, the combination of a central support, the series of plates forming a core, the rods 5, to which the plates are secured, attached at one end to the said central support, the plates 3, supported upon the said central support and provided with a series of perforations through which pass the said rods 5, and means for moving the said plate longitudinally upon its central support to adjust the size of the core, substantially as set forth.

6. In a device adapted for use in the laying of sewer, drain, and water pipes, the combination of the central rod 1, the sleeve 2, movable thereon, the plate 3, carried by the sleeve, a series of rods 5, each secured at one end to the rod 1 and passing through the perforations in the plate 3, and the series of plates 6, carried by the rods 5 and forming a cylindrical core surrounding the central rod 1, substantially as set forth.

7. In a device adapted for use in the laying of sewer, drain, and water pipes, the combination of the central support, the series of rods 5, carried by the central support, the series of plates 6, flexibly supported at the ends of the said rods, and the springs which tend to force outward the said plates, substantially as set forth.

8. In a device adapted for use in the laying of sewer, drain, and water pipes, the combination of the central support, a core consisting of a series of plates arranged around the said support, means for moving outward and inward the said plates to expand and contract the said core, and the springs which tend to force outward the plates, substantially as set forth.

9. In a device adapted for use in the laying of sewer, drain, and water pipes, the combination of the central rod 1, the sleeve 2, mounted upon the rod, the perforated plate 3, carried by the sleeve, the series of rods 5, arranged around the central rod 1, to which they are secured at their ends and passing through the perforations in the plate 3, the series of plates 6, supported upon the free ends of the rods 5, and the springs 10, connected each with one of the plates and to a thimble surrounding the sleeve 2 and tending to force outward the plates 6, substantially as set forth.

10. In a device for use in the laying of sewer, drain, and water pipes, an expansible core consisting of a series of plates adapted to conform to the interior surface of the pipes, held outward with a yielding pressure and having their forward ends curved or bent inward, substantially as set forth.

In testimony whereof I affix my signature in presence of two witnesses.

EDWIN H. ROSE.

Witnesses:
G. L. HUTCHINSON,
L. M. SPRECHER.